United States Patent [19]

Hayes et al.

[11] Patent Number: 5,359,546
[45] Date of Patent: Oct. 25, 1994

[54] AUTOMATIC GENERATION OF TEST DRIVERS

[75] Inventors: Roger Hayes, San Francisco; Luigi A. Pio-di-Savoia, Mountain View, both of Calif.

[73] Assignee: Sun Microsystems, Inc., Mountain View, Calif.

[21] Appl. No.: 906,692

[22] Filed: Jun. 30, 1992

[51] Int. Cl.$^5$ .............................. G06F 15/20
[52] U.S. Cl. ........................ 364/579; 371/19
[58] Field of Search .............. 364/579, 580; 371/19, 371/27

[56] References Cited

U.S. PATENT DOCUMENTS

| | | | |
|---|---|---|---|
| 4,550,406 | 10/1985 | Neal | 371/27 X |
| 4,595,981 | 6/1986 | Leung | 371/19 X |
| 4,729,096 | 3/1988 | Larson | 395/700 |
| 5,159,600 | 10/1992 | Chintapalli et al. | 371/27 |

Primary Examiner—Edward R. Cosimano
Attorney, Agent, or Firm—Blakely Sokoloff Taylor & Zafman

[57] ABSTRACT

A test driver generator is provided for generating test drivers from test function designations and attribute value specifications of software interfaces. For each set of designations and specifications for a software interface, the test driver generator generates a test driver. The test driver executes the designated test functions selectively based on selections provided at its invocation, using the selected combinations of attribute values specified. For each selected combination of attribute values of each selected test function, the test driver creates the test data for the particular combination of attribute values, executes the selected test function and deletes the created test data. The test driver repeats the process for all selected combinations of attribute values of all selected test functions. For some embodiments, the test driver generator also generates attribute instance creation functions for providing the test driver with an assignable attribute value for each attribute of a selected test function's parameters. Additionally, the test driver either creates or deletes the test data in line or calls a user provided test data creation and deletion function to create and delete the test data. Furthermore, the test function may be auto-checking. In that event, the test driver also accumulates test statistics after each test function execution.

26 Claims, 23 Drawing Sheets

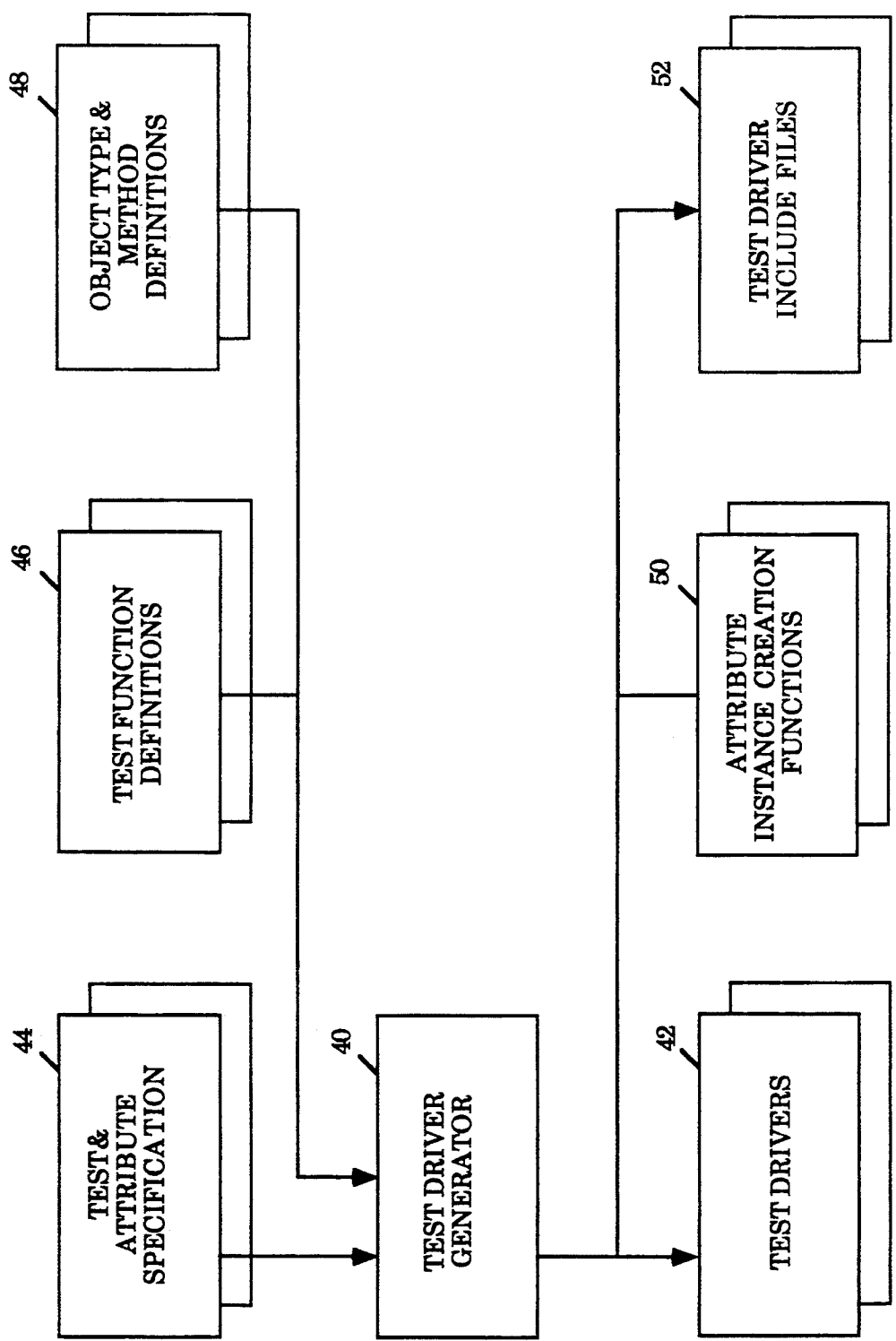

```
interface am                              57'
size:enum(negative,zero,small,large)    /
                                                      55a'
parameter acct=account                              }
          attr bal:enum(neg,zero,tiny,huge,enorm)
          attr typ:enum(economy, standard, gold)
end
                      55b'
parameter amt=amount }
          attr sz:size
end
                                                      55c'
parameter bank=am                                   }
          attr type:enum(commerce,snal,consumer,cu)
end test bank.create_account(amt,acct)   ~53a'
test acct.withdraw(amt)   ~53b'
test acct.deposit(amt)   ~53c'
```

```
#include "contract_test.h"
#include "am.h"
#include "am_aux.h"

BitVec test_am_create_account(am_fp obj, int opening_balance, am_account_fp &result) raises
    ExceptionallyFault, MissingException, UnexpectedException
BitVec test_am_account_deposit(am_account_fp obj, int deposit_amount) raises ExceptionallyFault,
    MissingException, UnexpectedException
BitVec test_am_account_withdraw(am_account_fp obj, int with_amount) raisees ExceptionallyFault,
    MissingException, UnexpectedException
BitVec test_am_account_get_balance(am_account_fp obj, int &result) raises UnexpectedException,
    ExceptionInCondition
```

```
%types 3
amount int32 int builtin
am am.am_fp object
account am.account am_account_fp object %inherits 1
generic_object : "misc.generic_object"

%methods 4
am.create_account "am_test.h" test_am_create_account <default> (copy inst32) produce am.acc
account.deposit "am_test.h" tst_am_account_deposit <default> (copy int32) produce <void>
account.withdraw "am_test.h" test_am_account_withdraw <default> (copy int32) produce <void>
account.get_balance "am_test.h" test_am_account_get_balance <default> () produce int32
```

```
#include "am_test.h"
static void run_test_am_create_account()                    ~91a
{
    NotePad precond("Input");
    AttrStat*subfun=AttrStat::make("am_create_account",verbosity);

int totct = attr_bank_type::ct() *
        attr_size::ct() *
        1;
        subfun->predict(totct);
        subfun->begin();
for (int i0 = 0; i0 < attr_bank_type::ct(); i0++) {
attr_bank_type t0(i0);                                      ⎬  92a
for (int i1 = 0; i1 < attr_size::ct(); i1++) {
attr_size s0(i1);
        ct++;
        precond.reset();                                          86
        subfun->start(ct);

am_fp b0;
//notate attribute values
precond.note("type",t0.print());
if(!provide_bank(b0,t0)) {
        subfun->skip(precond);
        continue;
}                                                           ⎬  93a int a();
//notate attribute values
precond.note("sz",s0.print());
if(!provide_amt(a0,s0)) {
        subfun->skip(precond);
        continue;
}
```

```
// produced by test proc       }~94a
am_account_fp r0

//loopcore
     subfun->run(precond);
     try {
          test_start(ct);                                        }~95a
          BitVecPair res = test_am_create_account(b0,a0,r0);
          subfun->ok(res);
     } except ex {
          MissingException {
               subfun->me(ex.before, ex.after);
          }
          UnexpectedException {
               subfun->ue(ex.before, ex.after, ex.raised);
          }
          ExceptionallyFault {
               subfun->ef(ex.before, ex.after, ex.raised, ex.pad);   }~96a
          }
          NormallyFault {
               subfun->nf(ex.before, ex.after, ex.pad);
          }
          ExceptionInCondition {
               subfun->nf(ex.before, ex.after, ex.pad);
          {
          default {
               panic("bad exception in test driver");
          }
// value produced by tested method (storage leak?) : r0
relinquish_amt(a0, s0);           }~97a
relinquish_bank(b0,t0);
}}
     //statistics reporting
     subfun->end();
     gfailct += subfun->failcount();   }~98a
     delete subfun;
}
```

*FIGURE 8b*

```
#include "am_test.h"
static void run_test_am_account_withdraw()     91b
{
    NotePad precond("Input");
    AttrStat* subfun = AttrStat::make("am_account_withdraw",verbosity);

int totct =
        attr_acct_bal::ct() * attr_acct_typ::ct() *
        attr_size::ct() * 1;
        subfun->predict(totct);
        subfun->begin();
for (int i0 = 0; i0 < attr_acct_bal::ct(); i0++) {
attr_acct_bal b0(i0);
for (int i1 = 0; i0 < attr_acct_typ:ct(); i1++) {     92b
attr_acct_typ t0 (i1);
for (int i2 = 0; i2 < attr_size::ct(); i2++) {
attr_size s0(i2);
    ct++;
    precond.reset();
    subfun->start(ct);                                     88 am_account_fp a0;
// notate attribute values                       93b
precond.note("bal", b0.print());
precond.note("type", t0.print ());
if (!provide_acct(a0, b0, t0)) {
    subfun->skip(precond);
    continue;
} int a1;
//notate attribute values
precond.note("sz", s0.print());
if (!provide_amt(a1, s0)) {
    subfun->skip(precond);
    continue;
}
```

*FIGURE 8c*

```
//loop core
subfun->run(precond);
try {
        test_start(ct);                                     ⎫ 95b
        BitVecPair res = test_am_account_deposit(a0, a1);   ⎬
        subfun->ok(res);                                    ⎭
} except ex {
        MissingException {
                subfun->me(ex.before, ex.after);            ⎫ 96b
        }
        UnexpectedException {
                subfun->ue(ex.before, ex.after, ex.raised);
        }
        ExceptionallyFault {
                subfun->ef(ex.before, ex.after, ex.raised, ex.pad);    88
        }
        NormallyFault {
                subfun->nf(ex.before, ex.after, ex.pad);
        }
        ExceptionInCondition {
                subfun->eic(ex.before, ex.after, ex.raised,
                        ex.state, ex.pad);
        {
        default {
                panic("bad exception in test driver");
        }
relinquish_amt(a1, s0);      ⎫ 97b
relinquish_acct(a0, b0, t0); ⎭
}}}
        // statistics reporting      ⎫ 98b
        subfun->end();               ⎬
        gfailct += subfun->failcount();
        delete subfun;               ⎭
}
```

FIGURE 8d

```
#include "am_test.h"
static void run_test_am_account_deposit()      ——91c
{
    NotePad precond("Input");
    AttrStat* subfun = AttrStat::make("am_account_deposit",verbosity);

int totct =
         attr_acct_bal::ct() * attr_acct_typ::ct() *
         attr_size::ct() * 1;
         subfun->predict(totct);
         subfun->begin();
for (int i0 = 0; i0 < attr_acct_bal::ct(); i0++) {
attr_acct_bal b0(i0);
for (int i1 = 0; i0 < attr_acct_typ:ct(); i1++) {         92c
attr_acct_typ t0 (i1);
for (int i2 = 0; i2 < attr_size::ct(); i2++) {
attr_size s0(i2);
    ct++;
    precond.reset();
    subfun->start(ct);

am_account_fp a0;
// notate attribute values
precond.note("bal", b0.print());
precond.note("type", t0.print ());
if (!provide_acct(a0, b0, t0)) {
    subfun->skip(precond);
    continue;
}                                                          93c int al;
//notate attribute values
precond.note("sz", s0.print());
if (!provide_amt(a1, s0)) {
    subfun->skip(precond);
    continue;
}
```

```
//loop core
subfun->run(precond);
try {
    test_start(ct);
    BitVecPair res = tst_am_account_deposit(a0, a1);
    subfun->ok(res);
} except ex {
    MissingException {
        subfun->me(ex.before, ex.after);
    }
UnexpectedException {
    subfun->ue(ex.before, ex.after, ex.raised);
}
    ExceptionallyFault {
    subfun->ef(ex.before, ex.after, ex.raised, ex.pad);
}
NormallyFault {
    subfun->nf(ex.before, ex.after, ex.pad);
}
ExceptionInCondition {
    subfun->eic(ex.before, ex.after, ex.raised, ex.state, ex.pad)
{
default {
    panic("bad exception in test driver");
}
ιquish_amt(al, s0);
ιquish_acct(a0, b0, t0);

// statistics reporting
subfun->end();
gfailct += subfun->failcount();
delete subfun;
```

*FIGURE 8f*

```
main(int ac, char **av) {
    Flag f_am_create_account("am_create_account,"test");
    Flag f_am_account_withdraw("am_account_withdraw", "test");
    Flag f_am_account_deposit("am_create_account","test");

attr_init(ac,av);

if(ac < 2 || f_help) {
        Flag::list(cout,"am.attr");
        exit(0);
    }
    if(f_all || f_am_create_account) {
        run_test_am_create_account();
    }
    if (f_all || f_am_account_withdraw) {
        run_test_am_account_withdraw();
    }
    if(f_all || f_am_account_deposit) {
        run_test_am_account_deposit();
    }
    report_result(gfailct == 0);
    exit(gfailct);
}
```

```
#pragma once
#include <attr,h>
#include "am.h"

class attr_bool : public attr {
public:
        // this enumeration can be convenient in provide functions.
        enum attr_bool_Kind {False, True};
        char*print();
        int    val;
                attr_bool(int i);
            static int   ct();
};

class attr_size : public attr {
public:
        // this enumeration can be convenient in provide functions.
        enum attr_size_Kind {negative, zero, small, large};
        char*print();
        int    val;
                attr_size(int i);
            static int   ct();
};

class attr_acct_bal : public attr {
public:
        // this enumeration can be convenient in provide functions.
        enum attr_acct_bal_Kind {neg, zero, tiny, huge, enorm};
        char*print();
        int    val;
                attr_acct_bal(int i);
            static int   ct();
};
```

```
class attr_acct_typ : public attr {
public:
    // this enumeration can be convenient in provide functions.
    enum attr_acct_typ_Kind {economy, standard, gold};
    char*print();
    int    val;
        attr_acct_typ(int i);
    static int   ct();
};
```
⎬ 104c

```
class attr_bank_type : public attr {
public:
    // this enumeration can be convenient in provide functions.
    enum attr_bank_type_Kind {commerce, sn1, consumer, cu};
    char*print();
    int    val;
        attr_bank_type(int i);
    static int   ct();
};
```
⎬ 104d

```
// the following must be defined by the user
bool provide_acct (am_account_fp &acct_var, attr_acct_bal b0,
    attr_acct_typ t0);
void relinquish_acct (am_account_fp &acct_var, attr_acct_bal b0,
    attr_acct_typ t0);
```
⎬ 106a

```
bool provide_amt (int &amt_var, attr_size s0);
void relinquish_amt (int &amt_var, attr_size s0);
```
⎬ 106b

```
bool provide_bank (am_fp &bank_var, attr_bank_type t1);
void relinquish_bank (am_fp &bank_var, attr_bank_type t1);
```
⎬ 106c

*FIGURE 9b*

```
#include "am_attr.h"
char* attr_bool::print() {
    switch (val) {
        case False: return "False";
        case True:  return "True";
        default: panic("unknown attr val");
            return "????";
    }
}
attr_bool::attr_bool(int i) {
    if (i < 0 || i > ct ()) {
        panic ("bad value to attr constructor");
    }
    val = i;
}
int attr_bool::ct () {
    return 2;
} char* attr_size::print () {
    switch (val) {
        case negative:  return "negative";
        case zero:      return "zero";
        case small: return "small";
        case large: return "large";
        default: panic ("unknown attr val");
            return "????";
    }
}
attr_size::attr_size (int i) {
    if (i <0 || i > ct()) {
        panic ("bad value to attr constructor");
    }
    val = i
} int attr_size::ct () {
    return 4;
}
```

```
char* attr_acct_bal::print () {
    switch (val) {
        case neg:       return "neg";
        case zero:      return "zero";
        case tiny:      return "tiny";
        case huge:      return "huge";
        case enorm:     return "enorm";
        default: panic ("unknown attr val");
                return "????";
    }
}
attr_acct_bal::attr_acct_bal(int i) {
    if (i < 0 | | i > ct ()) {
        panic("bad value to attr constructor")
    }
    val = i;
}
int attr_acct_bal::ct() {
    return 5;
}
```

```
char* attr_acct_typ::print() {
    switch (val) {
        case economy:       return "economy";
        case standard:      return "standard";
        case gold:          return "gold";
        default: panic ("unknown attr val");
                    return "????";
    }
}
attr_acct_typ::attr_acct_typ (int i) {
    if (i < 0 || i > ct ()) {
        panic ("bad value to attr constructor");
    }
    val = i;
}
int attr_acct_typ::ct() {
    return 3;
}
```
⎫
⎬ 114
⎭

108c

```
char* attr_bank_type::print() {
    switch (val) {
        case commerce:      return "commerce";
        case snl:           return "snl";
        case consumer:      return "consumer";
        case cu:            return "cu";
        default: panic ("unknown attr val");
                    return "????";
    }
}
attr_bank_type::attr_bank_type(int i) {
    if (i < 0 || i > ct ()) {
        panic ("bad value to attr constructor");
    }
    val = i;
}
int attr_bank_type::ct() {
    return 4;
}
```
⎫
⎬ 116
⎭

*FIGURE 10c*

```
#include "am.h"
#include "am_attr.h"

const char *service_name = "simple_account_manager";

bool
provide_acct (am_account_fp &a, attr_acct_bal bal) { am_fp acct_mgr = EZLOOKUP (*village_namer, service_name, am);

am_amount opening_balance;
      switch (bal.val) {
              case attr_acct_bal::neg:
                      opening_balance = -10;
                      break;
              case attr_acct_bal:: zero:
                      opening_balance = 0;
                      break;
              case attr_acct_bal::tiny:
                      opening_balance = 100;
                      break;
              case attr_acct_bal::huge:
                      opening_balance = 1000;
                      break;
              case attr_acct_bal::enorm:
                      opening_balance =10000;
                      break;

default:
                      // should not get here
                      cout <<  "bad value for attr_acct_bal\n";
                      return FALSE;
      }
      try {
      a = acct_ mgr->create_account(opening_balance);
      } except ex {
      am_negative_amount {
      cout << "create_account raised am. negative_amount\n";
          return FALSE;
      }
      contract_ fault {
      cout <<
          form("create_account raised contract_failure (#%x)\n", ex.code);
              return FALSE;
      }
      default {
          cout << "create_account raised unknown exception";
          return FALSE;
      }
   }
   return TRUE;
}
```

```
void
relinquish_acct(am_account_fp &a, attr_acct_bal bal) {
  a->consume();
```

124A

```
bool
provide_amt (am_amount &a, attr_size size) { switch(size.val) {
                case attr_size::negative:
                        a = -10;
                        break;
                case attr_size::zero:
                        a = 0;
                        break;
                case attr_size::small:
                        a = 100;
                        break;
                case attr_size::large:
                        a = 1000;
                        break;
                default:
                        // should not get here
                        cout << "bad value for attr_size_size\n'
                        return FALSE;
        }
        return TRUE;
} void
relinquish_amt (am_amount &a, attr_size s) {
   // no work to do
} bool
provide_bank (am_fp &a, attr_bank_type t0) {
   if (t0.val -- attr_bank_type::consumer)     {
      am_fp acct_mgr = EZLOOKUP (*village_namer,
service_name, am);
      a = acct_mgr;
      return TRUE;
   } else {
      return FALSE;
   }
}
void
relinquish_bank (am_fp &bank_var, attr_bank_type t0) {
   // make bank_var go away, the test driver is done with it
   bank_var->consumer();
}
```

AUTOMATIC GENERATION OF TEST DRIVERS

This application is related to a co-pending U.S. patent application, Ser. No. 07/906,697, filed concurrently, entitled *Automatic Generation of Auto-Checking Test Functions*, which is also assigned to the assignee of the present invention, Sun Microsystems, Inc. of Mountain View, Calif.

BACKGROUND OF THE INVENTION

1. Field of the Invention

The present invention relates to the field of software testing. More specifically, the present invention relates to automatic generation of test drivers for executing auto-checking test functions.

2. Art Background

Traditionally, software testing was done on an ad-hoc basis. As the complexity of software increases with increasing function being offered, various approaches, techniques and tools have been developed to provide a more structured or disciplined approach to software testing. From a process perspective, typically a phase approach is used to divide software testing into different stages, such as requirement testing, design testing, unit testing, function testing, and system testing. For each stage, different testing techniques, such as boundary value testing and sampling, are applied to improve test coverages. Additionally, various testing tools, such as test case generators and simulators, are developed to improve testing efficiency.

Traditionally, software specification and design were also done on an informal basis. Similarly, as the complexity of software increases with increasing function being offered, various techniques and tools have been developed to provide a more formal approach to software specification and design. Particular examples of formal design techniques include top down design and data flow analysis. Particular examples of formal design tools include formal specification and design languages and various Computer Aided Software Engineering (CASE) tools.

The advent of formal specification and design languages offers a new opportunity for further imposing structure and discipline on software testing. The formal specifications can be submitted to machine based analysis. If the proper behavior of a software interface can be adequately described by its formal specification, then testing functions can be automatically and systematically generated for the software interface from the formal specification. Furthermore, the generated testing functions can be auto-checking. An auto-checking test function is a function that can invoke and execute a procedure to be tested and knows enough about the procedure to be able to determine whether the procedure behaved properly or improperly when the procedure was tested. A particular example of such auto-checking testing function generator is disclosed in the related U.S. patent application, Ser. No. 07/906,697.

Typically, each auto-checking testing function requires a number of parameters to be provided as inputs. Each parameter may have one or more attributes, and each attribute may take on one of a number of discrete values or any value over a range. Thus, even for a small number of parameters and attributes, the potential combinations of input values are enormously large, and, for all practical purposes, approach infinity.

Therefore, it is desirable to be able to provide a test driver for a software interface that can execute a collection of auto-checking test functions selectively to test the software interface. It is further desirable if the auto-checking test functions can be executed selectively for selected combinations of the attribute values of the auto-checking attributes of the parameters of the test function. It is further desirable to have such a test driver automatically generated from a specification designating the auto-checking test functions of the software interface and specifying selected attribute values of the attributes of the parameters of the test function.

As will be disclosed, the present invention provides methods and apparatus for designating auto-checking test functions of software interfaces and specifying selected attribute values of the attributes of the parameters of the test function, and automatically generating from these designations/specifications, test drivers for executing these auto-checking test functions selectively with all combinations of the selected attribute values, thereby achieving the desired results described above.

SUMMARY OF THE INVENTION

Methods and apparatus for designating auto-checking test functions of software interfaces and specifying selected attribute values of the attributes of the parameters of the test function, and automatically generating from these designations/specifications, test drivers for executing these auto-checking test functions selectively with all combinations of the selected attribute values are disclosed. The methods and apparatus have particular application to automated software testing, in particular, software interfaces having a number of procedures and corresponding auto-checking test functions. The procedures and the auto-checking test functions may be implemented in any of the well known programming languages, such as C, employing any of the well known programming methodologies, such as objected oriented programming.

A test driver generator is provided for generating test drivers. The test driver generator receives test function designations of software interfaces and corresponding attribute value specifications for the designated attributes of the parameters of the test function. Each test function designation designates a number of test functions to be executed, and each corresponding attribute value specification specifies selected attribute values of the attributes of the parameters of the test function. For each collection of test function designations and corresponding attribute value specifications of a software interface, the test driver generator, in response, generates a test driver that can execute the specified auto-checking test functions selectively with all combinations of the selected attribute values of the attributes of the parameters of the test function.

In the presently preferred embodiment, the test functions and the corresponding selected attribute values are designated/specified in a combined test function and attribute value designation/specification. For some embodiments, depending on the programming languages used for the auto-checking test functions and the programming methodologies employed for the software interfaces, the auto-checking test function designations, and the corresponding selected attribute value specifications are augmented by supplemental test function and/or object type and method definitions.

In one embodiment, the test driver generator comprises a parser, an intermediate representation builder, and a code generator. The parser receives the test function designations and the corresponding selected attribute value specifications as inputs, and tokenizes the test function designations and the attribute value specifications. The intermediate representation builder receives the tokenized test function designations and the tokenized attribute value specifications as inputs, and generates intermediate representations for these designations/specifications. The code generator receives the intermediate representations as inputs, and generates test drivers for selectively executing the designated auto-checking test functions with all combinations of the selected attribute values of the attributes of the parameters of the test function.

Furthermore, in this embodiment, the parser parses and tokenizes the test function designations and the attribute value specifications based on a YACC grammar. The intermediate representation builder builds a syntax tree. The code generator generates the test drivers using the syntax tree.

Each test driver is generated with the same execution flow for selective execution of the auto-checking test functions with all combinations of the selected attribute values of the attributes of the parameters of the test function. The test driver receives the test function selections at its invocation. For each selected test function, the test driver creates the combinations of the selected attribute values of the selected attributes of the parameters of the test function one at a time. For each combination of the selected attribute values, the test driver either creates actual test data in line or calls corresponding user supplied test data creation functions to create the actual test data. Then the test driver invokes the selected test function, and accumulates testing statistics based on results returned from the invoked test function. After accumulating the statistics, the test driver deletes all test data created for the particular combination of attribute values, calling user supplied test data deleting functions if necessary. The process is repeated for each combination of the selected attribute values of each selected test function.

For some embodiments, depending on the programming languages used for the test drivers, the test drivers are generated with complimentary test include files and/or attribute instance creation functions. The complimentary test driver include files comprise selected attribute value definitions for the designated attributes of the parameters of the test function, and user supplied test data creation and deletion function definitions. The complimentary attribute instance creation functions are invoked by the test drivers during execution to generate attribute values to create a particular combination of attribute values for attributes of the parameters of the test function.

BRIEF DESCRIPTION OF THE DRAWINGS

The objects, features, and advantages of the present invention will be apparent from the following detailed description of the preferred and alternate embodiments of the present invention with references to the drawings in which:

FIG. 3 shows a functional block diagram illustrating the input and output of the test driver generator of the present invention.

FIGS. 5a–5c show an exemplary combined test function and attribute value designation/specification, an exemplary collection of supplemental test function definitions and an exemplary collection of supplemental object type and method definitions of the present invention for an exemplary software interface.

FIGS. 8a–8g show an exemplary generated test driver of the present invention.

FIGS. 9a–9b show an exemplary generated test driver include file of the present invention.

FIGS. 10a–10c show an exemplary collection of generated attribute instance creation functions of the present invention.

FIGS. 11a–11b show three pairs of exemplary user supplied test data creation and deletion functions.

DETAILED DESCRIPTION PRESENTLY PREFERRED AND ALTERNATE EMBODIMENTS

Methods and apparatus for designated auto-checking test functions of software interfaces, and specifying selected attribute values for the attributes of the parameters of the test function, and automatically generating from these designations/specifications test drivers for selectively executing the test functions with all combinations of the selected attribute values are disclosed. The methods and apparatus have particular application to automated software testing, in particular, software interfaces having a number of procedures and corresponding test functions. The procedures and corresponding test functions may be implemented in any of the well known programming languages, such as C, employing any of the well known programming methodologies, such as object oriented programming. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily. Additionally, while the present invention is being described with auto-checking test functions, based on the descriptions to follow, it will be appreciated that the present invention may be practiced with test functions that are not auto-checking.

Figure 1:
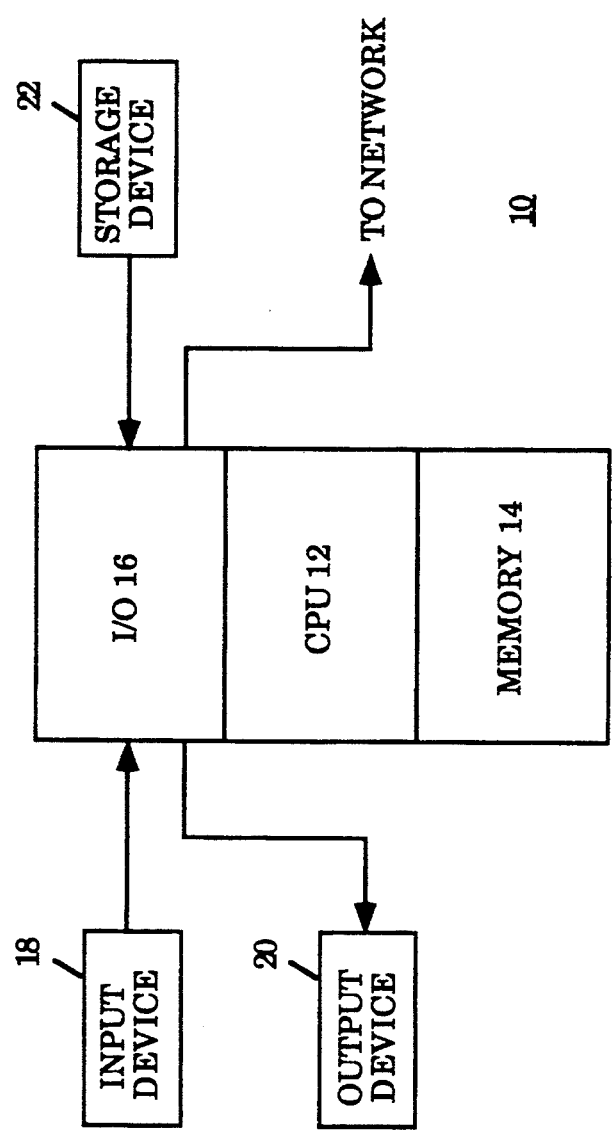
FIG. 1 shows a functional block diagram illustrating the hardware elements of an exemplary computer system that incorporates the teachings of the present invention.

Referring now to FIG. 1, a functional block diagram illustrating an exemplary computer system that incorporates the teachings of the present invention is shown. Shown is a computer 10 comprising a central processing unit (CPU) 12, a memory 14, and an I/O module 16. Additionally, the computer system 10 also comprises an input device 18, an output device 20 and a storage device 22. The CPU 12 is coupled to the memory 14 and the I/O module 16. The input device 18, the output device 20, and the storage device 22 are also coupled to the I/O module 16. The I/O module 16 in turn is coupled to a network.

Except for the manner they are used to practice the present invention, the CPU 12, the memory 14, the I/O module 16, the input device 18, the output device 20, and the storage device 22, are intended to represent a broad category of these elements found in most computer systems. Their constitutions and basic functions are well known and will not be further described here.

Figure 2:
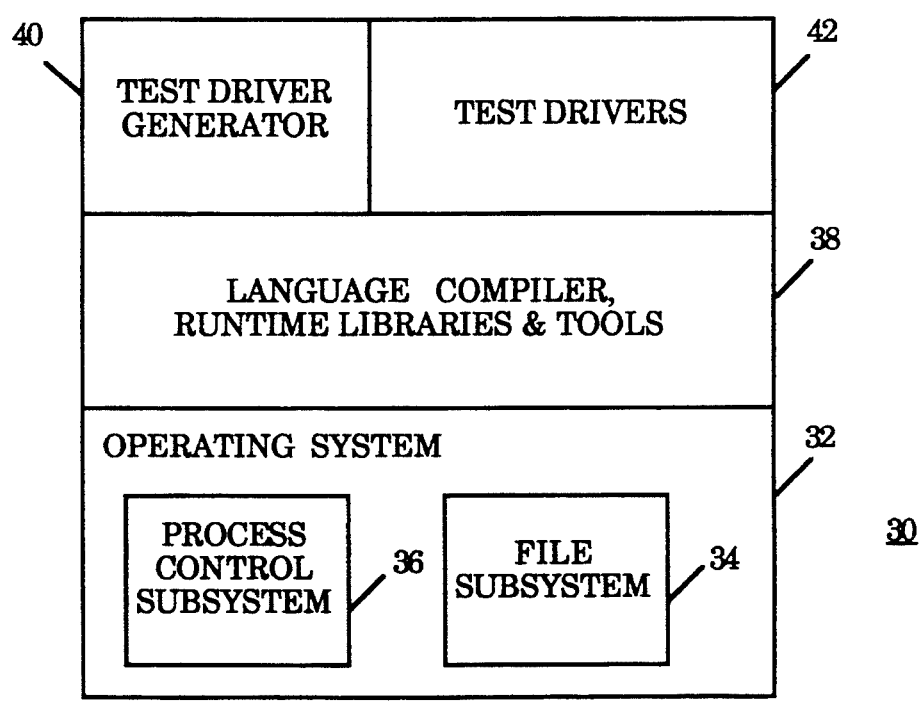
FIG. 2 shows a functional block diagram illustrating the software elements of the exemplary computer system of FIG. 1.

Referring now to FIG. 2, a functional block diagram illustrating the software elements 30 of the computer system of FIG. 1 is shown. Shown is an operating system 32 comprising a file subsystem 34 and a process control subsystem 36. The file subsystem 34 is responsible for managing files, allocating file spaces, administering free space, controlling access to files and retrieving data from files. The process control subsystem 36 is responsible for process synchronization, interprocess communication, memory management and process scheduling. The file subsystem 34 and the process control subsystem 36 are intended to represent a broad category of these elements found in most operating systems. Their constitutions and functions are well known and will not be further described here.

The software elements 30 further comprise programming language compilers, software tools/utilities and their runtime libraries 38, the test driver generator of the present invention 40, and the generated test drivers of the present invention 42. The programming language compilers, software tools/utilities and their runtime libraries 38 are used to develop and execute application programs, in particular, the test driver generator 40 and the generated test drivers 42 of the present invention. The language compilers, runtime libraries, tools/utilities 38 are intended to represent a broad category of these software elements found in most computer systems. Their constitutions and functions are well known, and will not be further described here. The test driver generator and the generated test drivers of the present invention will be described in further detail below with references to FIGS. 3, 6, 7, and 8a–8g.

While for ease of understanding, the present invention is being illustrated with embodiments of the test driver generator that are implemented in high-level programming languages, and test drivers that are generated in high-level programming languages, it will be appreciated, based on the descriptions to follow, that the present invention may be practiced with the test driver generator and the test drivers implemented/generated in a variety of programming languages.

Referring now to FIG. 3, a functional block diagram illustrating the input and output of the test driver generator of the present invention is shown. Shown is the test driver generator 40 receiving a number of test function designations of software interfaces, and corresponding selected attribute value specifications 44 for the attributes of the parameters of the test function as inputs. In the present preferred embodiment, the test function designations and the corresponding selected attribute value specifications for a software interface are made in a combined test function and attribute value designation/specification. For some embodiments, the test function designations and attribute value specifications are augmented with supplemental test function definitions 46, and/or object type and method definitions 48.

It will be appreciated that the test function designations, the attribute value specifications, the supplemental test function definitions 46, and the object type and method definitions 48 may be provided to the test driver generator 40 in a variety of manners. For examples, the designations, specifications and supplemental definitions may be provided through an input device or pre-stored in a storage device accessible to the test driver generator 40. The test function designations and attribute value specifications 44, the supplemental test function definitions 46 and the supplemental object type and method definitions 48 will be described in further detail with references to FIGS. 4a–4c, and 5a–5c.

Continue to refer to FIG. 3, for each collection of test function designations and attribute value specifications 44 of a software interface, the test driver generator 40 generates a test driver 42 for executing the designated auto-checking test functions selectively with all combinations of the selected attribute values. For some embodiments, depending on the programming languages used for the test drivers and the programming methodologies employed, the test drivers 42 are generated with complimentary test driver include files 52 and complimentary attribute instance creation 50. The complimentary test driver include files 50 are included during compilation of the test drivers 42. The complimentary attribute instance creation functions 50 are invoked by the test drivers 42 during execution. The test driver generator 40 will be described in further detail with references to FIG. 6. The test drivers 42, the test driver include files 52, and the attribute instance creation functions 50 will be described in further detail with references to FIGS. 7, 8a–8g, 9a–9b and 10.

Figure 4A:
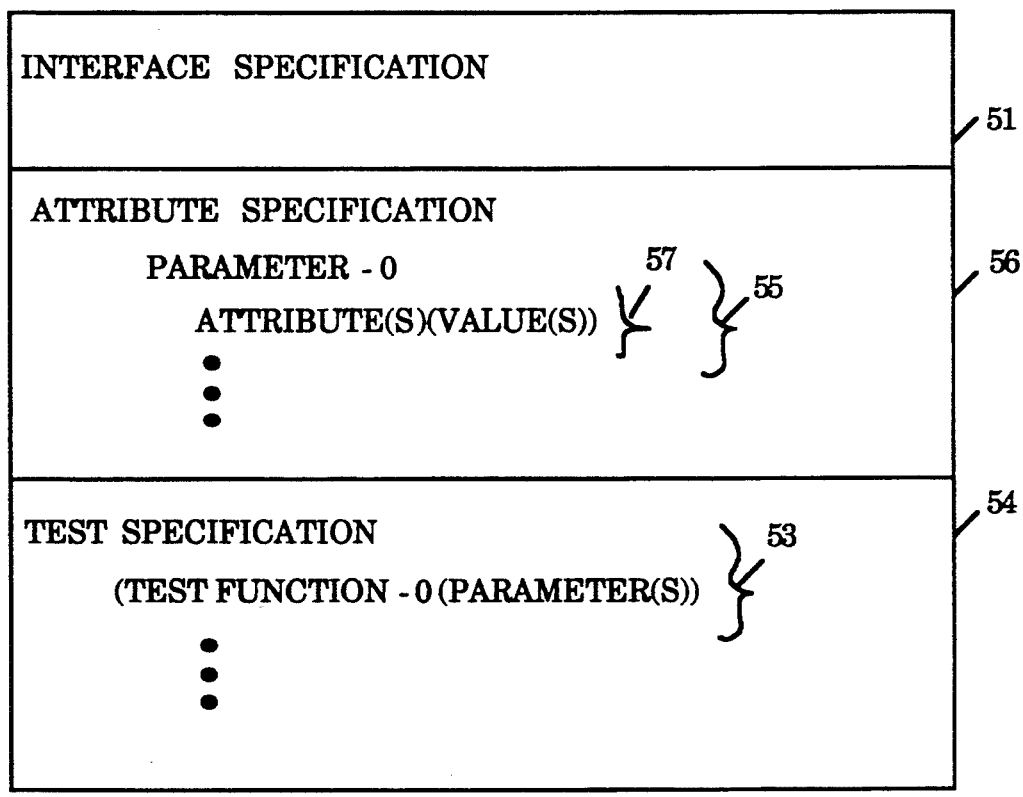
FIGS. 4a–4c illustrate the presently preferred embodiment of the combined test function and attribute value designation/specification, the supplemental test function definitions and the supplemental object type and method definitions of the present invention for a software interface.
Figure 4B:
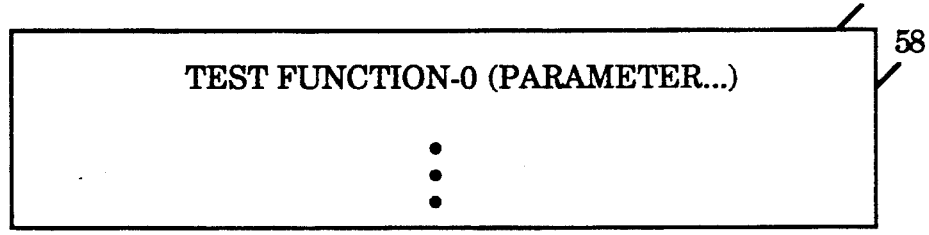
Figure 4C:
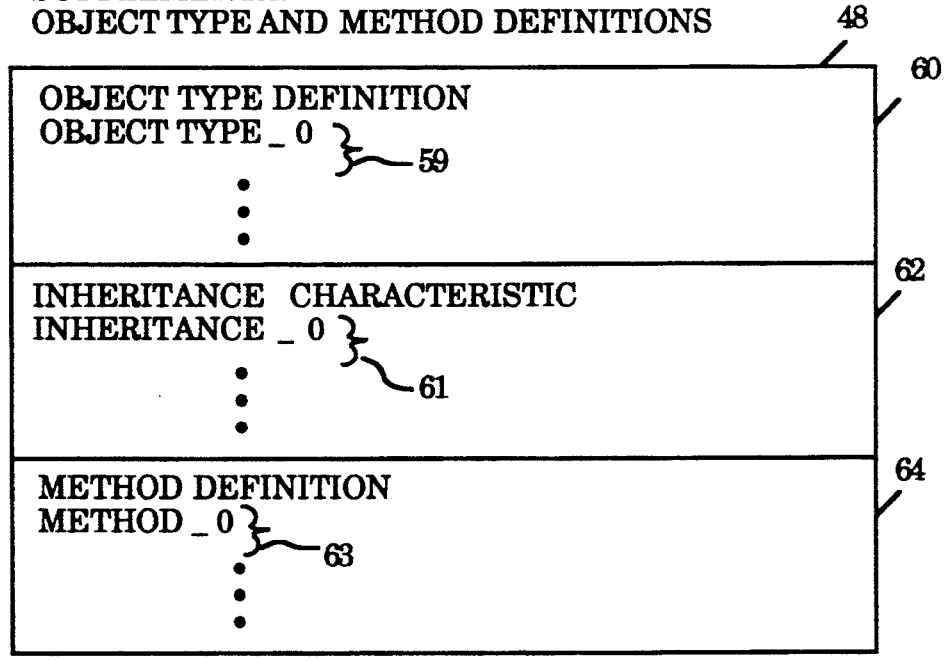

Referring now to FIGS. 4a–4c, three diagrams illustrating the presently preferred combined test function and attribute value designation/specification, the supplemental test function definitions, and the supplemental object type and method definitions of the present invention are shown. FIG. 4a illustrates the combined test function and attribute value designation/specification, while FIGS. 4b and 4c illustrate the supplemental test function definitions, and the supplemental object type and method definitions respectively.

Shown in FIG. 4a is a combined test function and attribute value designation/specification 44 comprising an interface identification 51, a number of test function definitions 54, one for each auto-checking test function corresponding to a procedure of the identified software interface, and a number of attribute value specifications 56, for the auto-checking functions' parameters. Each test function designation, e.g. 53, designates an auto-checking test function corresponding to a procedure of a software interface, including its parameters. Each attribute value specification, e.g. 57, specifies the selected attribute values for all attributes of a test function parameter 55. Additionally, the attribute value specifications 56 may support global declaration of attributes and their selected attributes values, thus allowing the globally declared attributes and their selected attribute values to be shared among test function parameters.

Shown in FIG. 4b is a collection of supplemental test function definitions 46 comprising a number of test function definitions, e.g. 58. Each supplemental test function definition, e.g. 58, defines an auto-checking test function and its parameters. A particular example of supplemental test function definition collection is the auto-checking test function include file generated by the auto-checking test function generator described in the related U.S. patent application, Ser. No. 07/906,697.

Shown in FIG. 4c is a collection of supplemental object type and method definitions 48 comprising a number of object type definitions 60, a number of inheritance definitions 62, and a number of method definitions 64. Each object type definition, e.g. 59 defines an object type of an object oriented software interface. Each inheritance definition, e.g. 61, defines an inheritance characteristic for an object class and its super class. Each method definition, e.g. 63, defines a method of an object orient software interface. A particular example of supplemental object type and method definition collection is the object type and method definition file generated by the auto-checking test function generator described in the related U.S. patent application, Ser. No. 07/906,697.

Except for the basic requirements described above, the auto-checking test functions of a software interface, and the corresponding selected attribute values of the parameters of the test function may otherwise be specified in a variety of manners. For further descriptions of auto-checking test function include files, and object type and method definition files generated by an automatic auto-checking test function generator, see the related U.S. patent application, Ser. No. 07/906,697.

Referring now to FIGS. 5a–5c, three diagrams showing an exemplary combined test function and attribute value designation/specification, an exemplary collection of supplemental test function definitions, and an exemplary collection of supplemental object type and method definitions are shown. FIG. 5a shows the exemplary combined test function and attribute value designation/specification, while FIGS. 5b and 5c show the exemplary collection of supplemental test function definitions and the exemplary supplemental object type and method definitions respectively.

Shown in FIG. 5a is an exemplary combined test function and attribute value designation/specification 44' for an object oriented interface "am" comprising three exemplary test function designations, 53a'–53c', designating three exemplary auto-checking test functions and their parameters, "bank.create_account", "acct.withdraw", and "acct.deposit" in C like syntax. Additionally, the exemplary combined test function and attribute value designation/specification 44' comprises three exemplary attribute value specifications, 55a'–55c', specifying exemplary attribute values for an exemplary attribute "bal" and an exemplary attribute "typ" for an exemplary test function parameter "acct", exemplary attribute values for an exemplary attribute "sz" for an exemplary test function parameter "amt", and exemplary attribute values for an exemplary attribute "type" for an exemplary test function parameter "bank". The exemplary attribute values for the exemplary attributes "bal", "typ" 55a' and "type" 55c' are explicitly specified, i.e. "neg, zero, tiny, huge, enorm", "economy, standard, gold", and "commercial, snl, consumer, cu". The exemplary attribute values for the exemplary attribute "sz" 55b' are implicitly specified through an exemplary globally declared attribute value "size", i.e. "negative, zero, small, large" 57'.

Shown in FIG. 5b is the exemplary supplemental collection of test function definitions "am_test.h" 46', comprising four exemplary test function definitions 58' for four exemplary auto-checking test functions, "test_am_create_account", "test_account_deposit", "test_account_withdraw", and "test_account_get_balance". For each exemplary auto-checking test function, the corresponding exemplary test function definition specifies its parameters.

Shown in FIG. 5c is an exemplary collection of object type and method definitions 48' comprising three exemplary object type definitions 60', one exemplary inheritance definition 62', and four exemplary method definitions 64'. The exemplary method definition "am.create_account" resolves the method "bank.create_account" (bank=am) to the exemplary auto-checking test function "test_am_create_account" whose parameters are to be resolved in the exemplary supplemental collection of test function definitions "am_test.h". Similarly, the exemplary method definition "account.deposit" resolves the method "acct.deposit" (acct=account) to the exemplary auto-checking test function "test_am_account_deposit" whose parameters are also to be resolved in the exemplary supplemental collection of test function definitions "am_test.h". Likewise, the exemplary method definition "account.withdraw" resolves the method "acct.withdraw" (acct=account) to the exemplary auto-checking test function "test_am_account_withdraw" whose parameters are to be resolved in the exemplary supplemental collection of test function definitions "am_test.h".

Figure 6:
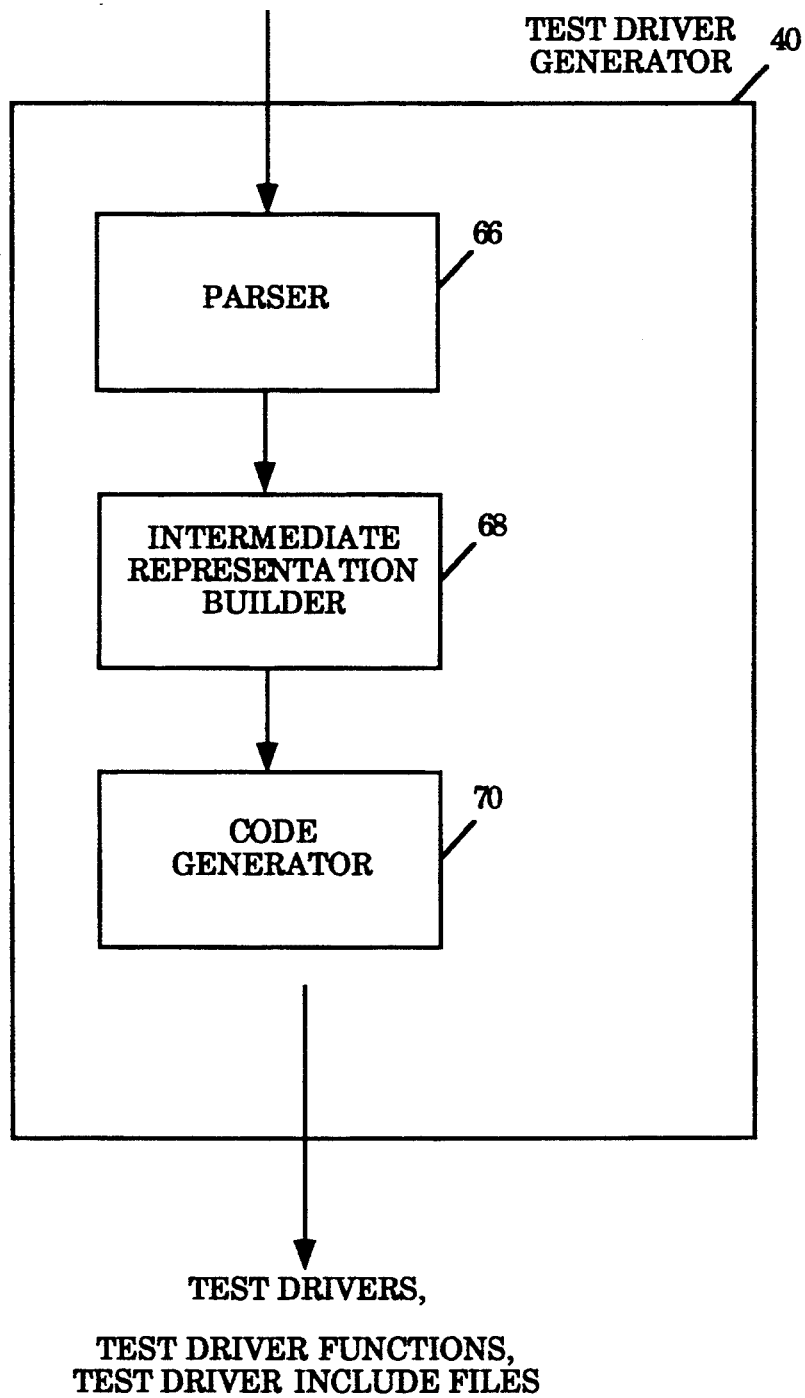
FIG. 6 shows a function block diagram illustrating one embodiment of the test driver generator of the present invention.

Referring now to FIG. 6, a functional block diagram illustrating one embodiment of the test driver generator of the present invention of the present invention is shown. Shown is the test driver generator 40 comprising a parser 66, an intermediate representation builder 68, and a code generator 70. These elements are sequentially coupled to each other. Together, they generate the test drivers, the parameter/attribute functions and the test driver include files of the present invention in C and C like syntaxes respectively for object oriented software interfaces whose auto-checking test functions are implemented in a programming language that supports inter-program call from a C program, in response to received test and parameter/attribute specifications using C like syntaxes.

The parser 66, the intermediate representation builder 68, and the code generator 70, are implemented in like manners similar to a broad category of equivalent elements found in many well known programming language compilers. Their constitutions, basic functions offered, and operation flows will only be briefly described here.

The parser 66 receives the test function designations and the attribute values specifications, including supplemental test function definitions, and/or supplemental object type and method definitions as inputs, and tokenizes the various designations, specifications and definitions. The intermediate representation builder 68 receives the tokenized designations, specifications, and definitions as inputs, and generates intermediate representations for these designations, specifications, and definitions. The code generator 70 receives the intermediate representations as inputs, and generates executable code for the test drivers and the attribute instance creation functions. Additionally, the code generator 70 also generates the test driver include files.

In this particular embodiment, the parser 66 parses and tokenizes the expressions based on a YACC grammar. The intermediate representation builder 68 builds a syntax tree. The code generator 70 generates the executable code for the test ddvers and the attribute instance creation functions, and the test driver include files using the syntax tree.

For further descriptions on various parsers, intermediate representation builders, code generators, and syntax trees, and closures, see various compiler text books well known in the art, such as A. V. Aho, R. Sethi, and J. D. Ullman, *Compilers Principles, Techniques and Tools*, Addison-Wesley, 1986, pp. 25-388, and 463-512.

It will be appreciated that the test driver generator of the present invention may be practiced with other embodiments having elements providing equivalent functions provided by the elements of the above embodiment. It will further be appreciated that these other embodiments may generate test drivers and attribute instance creation functions in programming languages other than C, related outputs in syntaxes other than being C like, in response to test function designations, attribute value specifications, and supplemental definitions, in syntaxes also other than being C like, and/or for software interfaces that are non-object oriented.

Figure 7:
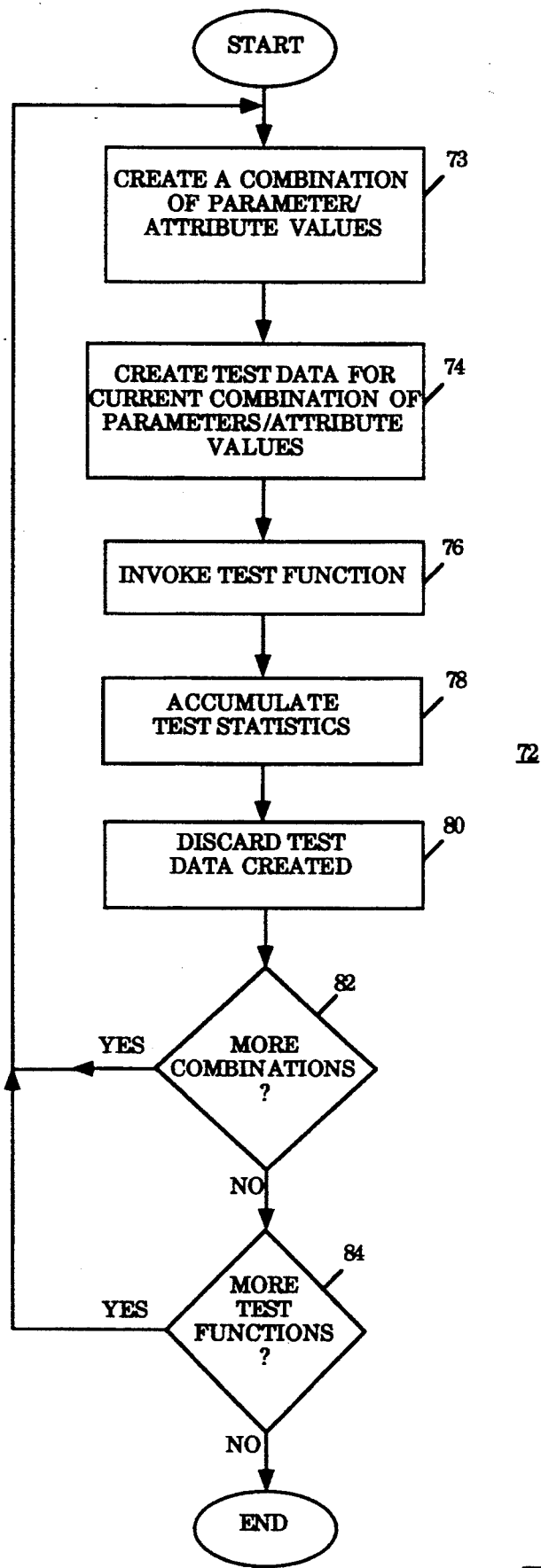
FIG. 7 illustrate the execution flow of each generated test driver of the present invention.

Referring now to FIG. 7, a block diagram illustrating the execution flow of each generated test driver is shown. Each generated auto-checking test function has the same execution flow 72. Initially, the test driver creates a combination of attribute values for the test function parameters, block 73. As described earlier, for some embodiments, the test driver calls the attribute instance creation functions to generate the attribute values for creating the particular combination.

Then, the test driver creates the test data for the particular combination of attribute values, block 74. The test driver either creates the test data in line and/or calls user supplied test data creation functions to create the test data. After creating the test data, the test driver invokes the auto-checking test function, block 76. Upon returning from the auto-checking test function, the test driver accumulates test statistics based on the results returned from the auto-checking test function, block 78. After accumulating test statistics, the test driver discards the test data created for the particular combination of attribute values, block 80, calling user supplied test data deletion functions if necessary.

Blocks 74-80 are repeated until they have been performed for each combination of the selected attribute values specified in the attribute value specifications. A determination is made whether more combinations exist, block 82. As long as combinations exist, execution flow returns to block 73. When no more combinations exist, a determination is made whether more test functions exist, block 84. As long as test functions exist, execution flow returns to block 73. When no test functions exist, execution ends. The user supplied test data creation and deletion functions will be described in further detail later with references to FIGS. 11a-11b.

Referring now to FIGS. 8a-8g, seven diagrams showing an exemplary generated test driver of the present invention are shown. Shown in FIGS. 8a-8g is the exemplary test driver generated for the exemplary test function and attribute value designation/specification and supplemental definitions of FIGS. 5a-5c, comprising three exemplary code segments, "run_test_am_create_account" 86, "run_test_am_account_withdraw" 88, and "run_test_am_account_deposit" 90, one for each exemplary auto-checking test function specified, "am.create_account" (bank=am), "account.withdraw" (acct=account), and "account.deposit" (acct=account). The name of each exemplary code segment 91a, 91b, 91c appears at the top of respective code segment 86, 88, 90. Each of the exemplary code segments 86, 88 or 90 has an execution flow as described earlier.

Initially, the exemplary code segment, 86, 88 or 90, invokes the appropriate attribute instance creation functions, "attr_bank_type", "attr_size", "attr_acct_bal", and/or "attr_acct_typ", to create instances of the selected attribute values for the attributes of the parameters of the test function, 92a, 92b, or 92c. After creating the combination, the exemplary code segment, 86, 88 or 90, creates the test data for the particular combination of attribute values by invoking the appropriate exemplary user supplied test data creation functions, "provide_bank", "provide_amt", and/or "provide_acct", 93a, 93b, or 93c. Additionally, the exemplary code segment 86 also creates storage for an output of the auto-checking test function in line 94a.

Then, the exemplary code segment, 86, 88 or 90 invokes the exemplary auto-checking test function, "test_am_create_account", "test_am_account_withdraw", or "test_am_account_deposit", 95a, 95b, or 95c. Upon returning, the exemplary code segment, 86, 88 or 90 accumulates testing statistics based on the results returned from the invoked auto-checking function, 96a, 96b, or 96c. The exemplary code segment, 86, 88 or 90 then invokes the appropriate exemplary user supplied test data deletion functions, "relinquish_amt", "relinquish_bank", and/or "relinquish_acct", to delete the created test data, 97a, 97b or 97c. Lastly, the exemplary code segment, 86, 88 or 90, reports on the accumulated statistics 98a, 98b, or 98c. These steps are repeated for each combination of attribute values of the test function parameters.

Furthermore, as illustrated in FIG. 8d the exemplary test driver further comprises an exemplary selection code segment 100 for controlling selective execution of one or more of the three exemplary code segments, "run_test_am_create_account" 86, "run_test_am_account-withdraw" 88, and "run_test_am_account_deposit" 90.

Referring now to FIGS. 9a-9b, are diagrams showing an exemplary generated test driver include file are shown. The test driver include files are used to define other common include files, the attribute values specified, and the user supplied test data creation and deletion functions for the generated test drivers.

As shown in FIGS. 9a-9b, the exemplary test driver include file 102 generated in conjunction with the test driver for the exemplary test function and attribute value designation/specification and the supplemental definitions of FIGS. 5a-5c comprises four exemplary attribute value definitions, 104a-104d, one for each set of the exemplary attribute values specified, "size", "acct_bal", "acct_typ", and "bank_type", and three exemplary pairs of user supplied test data creation and deletion functions, "provide_acct" and "relinquish_acct", "provide_amt" and "relinquish_amt", and "provide_bank" and "relinquish_bank", 106a-106c.

Referring now to FIGS. 10a-10c, three diagrams showing an exemplary collection of generated attribute instance creation functions are shown. The generated attribute instance creation functions 108a, 108b are invoked by the test driver during its execution for construction of a particular combination of attribute values for the attributes of the parameters of the test function. The generated attribute instance creation functions comprise an attribute instance creation function for each of the attributes specified in the test function and attribute value designation/specification. Each generated attribute instance creation function receives an index value as input. In response, the generated attribute instance creation function returns an attribute value specified in the test function and attribute value designation/specification.

As shown in FIGS. 10a–10c, the exemplary attribute instance creation functions generated for the exemplary test function and attribute value designation/specification and the supplemental definitions of FIGS. 5a–5c, comprise four exemplary attribute instance creation functions, "size", "acct_bal", "acct_typ", and "bank_type", 110-116, one for each of the four exemplary attributes "sz", "bal", "typ" and "type". In response to an input value, each of the four exemplary attribute instance creation functions, 110, 112, 114 or 116, returns a corresponding exemplary attribute value specified, i.e. "negative", "zero", "small" or "large" for the exemplary attribute "size", 110, "neg", "zero", "tiny", "huge" or "enorm" for the exemplary attribute "acct_bal", 112, "economy", "standard", or "gold" for the exemplary attribute "typ" 114, and "commerce", "snl", "consumer" or "cu" for the exemplary attribute "type" 116.

Referring now to FIGS. 11a–11b, two diagrams showing three exemplary pairs of user supplied test data creation and deletion functions of the present invention are shown. Each test data creation function creates the actual test data for a particular combination of attribute values of the attributes of the parameters of the test function. Each test data creation function receives the applicable attribute value for the particular combination as inputs. In response, the test data creation function creates the actual test data. Similarly each test data deletion function deletes the actual test data created for a particular combination of attribute values. Each test data deletion function receives the applicable attribute values for the particular combination as inputs. In response, the test data deletion function deletes the actual test data previously created.

As shown in FIGS. 11a–11b, the exemplary collection of test data creation and deletion functions, 120a and 120b, comprises three exemplary pairs of test data creation and deletion functions, "provide_acct" and "relinquish_acct", 122a and 124a, "provide_amt" and "relinquish_amt", 122b and 124b, and "provide_bank" and "relinquish_bank", 122c and 124c. The "provide_acct" and "relinquish_acct" functions, 122a and 124a, create and delete an "account" object of a particular "account balance". The "provide_amt" and "relinquish_amt", 122b and 124b, create and delete an "amount" object of a particular "amount size". The "provide_bank" and "relinquish_bank" functions, 122c and 124c, create and delete a "bank" object of a particular "bank type".

While the present invention has been described in terms of presently preferred and alternate embodiments, those skilled in the art will recognize that the invention is not limited to the embodiments described. The methods and apparatus of the present invention can be practiced with modification and alteration within the spirit and scope of the appended claims. The description is thus to be regarded as illustrative instead of limiting on the present invention.

What is claimed is:

1. In a computer system comprising a software interface having a plurality of executable procedures and corresponding executable test functions for testing said procedures, a computer implemented method for automatically generating an executable test driver for selectively executing said test functions, said method comprising the steps of:
   a) designating said test functions to a test driver generator;
   b) specifying assignable attribute values selected for each attribute of each parameter of said test functions to said test driver generator, said test functions comprising a plurality of parameters having a plurality of attributes, said attributes being assigned attribute values when said test functions are invoked for execution; and
   c) generating said test driver by said test driver generator based on said designated test functions and said specified assignable attribute values, said generated test driver when executed, selectively and recursively executing said test functions with all combinations of said specified assignable attribute values.

2. The method as set forth in claim 1, wherein, said test functions are auto-checking test functions.

3. The method as set forth in claim 1, wherein, selected ones of said test function designations and attribute value specifications are augmented by supplemental test function definitions.

4. The method as set forth in claim 1, wherein, said software interface is object oriented, and selected ones of said test function designations and attribute value specifications are augmented by supplemental object type and method definitions.

5. The method as set forth in claim 1, wherein, said step c) comprises generating an include file for said generated test driver, said include file comprising attribute definitions and user supplied test data creation and deletion function definitions, said include file being included at compilation of said generated test driver.

6. The method as set forth in claim 1, wherein, said step c) comprises generating attribute instance creation functions for said generated test driver, said attribute instance creation functions being called by said generated test driver during its execution to provide said generated test driver with a particular combination of said attribute values.

7. The method as set forth in claim 1, wherein, said step c) comprises the steps of:
   c.1) parsing and tokenizing said test function designations and attribute value specifications based on a YACC grammar;
   c.2) generating intermediate representations for said tokenized test function designations and attribute value specifications, said intermediate representation being a syntax tree; and
   c.3) generating executable code for said test driver using said generated intermediate representations.

8. In a computer system comprising a software interface having a plurality of executable procedures and corresponding executable test functions for testing said procedures, wherein said test functions comprising a plurality of parameters having a plurality of attributes, said attributes being assigned attribute values when said test functions are invoked, a computer implemented method for selectively executing said test functions with preselected attribute values, said method comprising the steps of:
   a) receiving selection for one or more of said test functions;
   b) choosing one of said selected test functions;

c) creating a combination of said preselected attribute values for said chosen test function;
d) creating test data for said created combination of said pre-selected attribute values;
e) executing said chosen test function with said created test data;
f) deleting said test data created for said created combination of said pre-selected attribute values;
g) repeating said steps c) through f) for each combination of said ore-selected attribute values;
h) repeating said steps b) through g) for each of said selected test functions.

9. The method as set forth in claim 8, wherein,
said test functions are auto-checking test functions; and
said step e) further comprises accumulating testing result statistics for said chosen test functions after executing each of said chosen test functions.

10. The method as set forth in claim 8, wherein, said created combination of said pre-selected attribute values is created in said step c) by calling attribute instance creation functions to provide a pre-selected attribute value for each of said attributes of said parameters of the chosen test function.

11. The method as set forth in claim 8, wherein, said test data is created and deleted in said steps d) and g) by calling a user supplied test data creation and a user supplied test data deletion function respectively.

12. In a computer system comprising a software interface having a plurality of executable procedures, a computer implemented method for selectively testing said software interface, said method comprising the steps of:
a) providing corresponding executable test functions for each of said procedures;
b) designating said test functions and specifying selected attribute values to be used with said designated test functions to a test driver generator, said selected attribute values being selectively assigned to attributes of parameters of said test functions when said test functions are invoked to test said procedures, said test functions comprising a plurality of parameters having a plurality of attributes;
c) generating a test driver by said test driver generator that selectively executes said test functions with said combinations of said selected attribute values, said test driver calling user supplied test data creation and deletion functions to create and delete test data for each of said combinations of said selected attribute values;
d) providing said test data creation and deletion functions; and
e) providing test function execution selection to said test driver, and executing said test driver.

13. The method as set forth in claim 12, wherein,
said test functions are auto-checking test functions; and
said test driver accumulates testing result statistics for said selected auto-checking test functions after executing each of said selected auto-checking test functions.

14. In a computer system comprising a central processing unit (CPU) and a software interface having a plurality of executable procedures and corresponding executable test functions for testing said procedures, an apparatus for automatically generating a test driver for selectively executing said test functions, said apparatus comprising:

a) designating means comprising said CPU for receiving designations of said test functions;
b) specification means comprising said CPU for receiving specifications of assignable attribute values selected for each attribute of each parameter of said test functions, said test functions comprising a plurality of parameters having a plurality of attributes, said attributes being assigned attribute values when said test functions are invoked for execution; and
c) generation means coupled said designation and specification means comprising said CPU for generating said test driver based on said designated test functions and said specified assignable attribute values, said generated test driver when executed, selectively and recursively executing said designated test functions with all combinations of said specified assignable attribute values.

15. The apparatus as set forth in claim 14, wherein, said test functions are auto-checking test functions.

16. The apparatus as set forth in claim 14, wherein, said designation and specification means are also for receiving supplemental test function definitions to augment some of said test function designations and attribute value specifications.

17. The apparatus as set forth in claim 14, wherein, said software interface is object oriented, and said designation and specification means are also for receiving supplemental object type and method definitions to augment some of said test function designations and attribute value specifications.

18. The method as set forth in claim 14, wherein, said generation means is also for generating an include file for said generated test driver, said include file comprising attribute definitions and user supplied test data creation and deletion function definitions, said include file being included at compilation of said generated test driver.

19. The apparatus as set forth in claim 14, wherein, said generation means is also for generating attribute instance creation functions for said generated test driver, said attribute instance creation functions being called by said generated test driver during its execution to provide said generated test driver with a particular combination of said attribute values.

20. The apparatus as set forth in claim 14, wherein, said generation means comprises:
c.1) parsing means coupled to said designation and specification means comprising said CPU for parsing and tokenizing said test function designations and attribute value specifications based on a YACC grammar;
c.2) intermediate representation generation means coupled to said parsing means comprising said CPU for generating intermediate representations for said tokenized test function designations and attribute value specifications, said intermediate representation being a syntax tree; and
c.3) code generation means coupled to said intermediate representation generation means comprising said CPU for generating executable code for said test driver using said generated intermediate representations.

21. In a computer system comprising a central processing unit (CPU) and a software interface having a plurality of executable procedures and corresponding executable test functions for testing said procedures, wherein said test functions comprising a plurality of parameters having a plurality of attributes, said attributes being assigned attribute values when said test functions are invoked, an apparatus for selectively executing said test functions with pre-selected attribute values, said apparatus comprising:

a) receiving means comprising said CPU for receiving selection for one or more of said test functions;

b) choosing means coupled to said receiving means comprising said CPU for choosing one of said selected test functions;

c) first creation means coupled to said choosing means comprising said CPU for creating a combination of said preselected attribute values for said chosen test function;

d) second creation means coupled to said first creation means comprising said CPU for creating test data for said created combination of said pre-selected attribute values;

e) execution means coupled to said second creation means comprising said CPU for executing said chosen test function with said created test data;

f) deletion means coupled to said second creation means comprising said CPU for deleting said test data created for said created combination of said pre-selected attribute values;

g) first repetition means coupled to said first and second creation means, said execution means and said deletion means, comprising said CPU for repeating said creations, said execution and said deletion for each combination of said pre-selected attribute values;

h) second repetition means coupled to said first and second creation means, said execution means, said deletion means, and said first repetition means, comprising said CPU for repeating said repetition of creations, execution, and deletion of each combination of said pre-selected attributes values for each of said selected test functions.

22. The apparatus as set forth in claim 21, wherein, said test functions are auto-checking test functions; and said execution means further comprises accumulation means comprising said CPU for accumulating testing result statistics for said chosen test functions after executing each of said chosen test functions.

23. The apparatus as set forth in claim 21, wherein, said first creation means creates said created combination of said pre-selected attribute values by calling attribute instance creation functions to provide a preselected attribute value for each of said attributes of said parameters of the chosen test function.

24. The apparatus as set forth in claim 21, wherein, said creation and deletion means creates and deletes said test data by calling a user supplied test data creation and a user supplied test data deletion function respectively.

25. In a computer system comprising a central processing unit (CPU) and a software interface having a plurality of executable procedures, an apparatus for selectively testing said software interface, said apparatus comprising:

a) first providing means comprising said CPU for providing corresponding executable test functions for each of said procedures;

b) designation and specification means comprising said CPU for designating said test functions and specifying selected attribute values to be used with said designated test functions, said selected attribute values being selectively assigned to attributes of parameters of said test functions when said test functions are invoked to test said procedures, said test functions comprising a plurality of parameters having a plurality of attributes;

c) generation means coupled to said designation and specification means for generating a test driver that selectively executes said test functions with combinations of said selected attribute values, said test driver calling user supplied test data creation and deletion functions to create and delete test data for each combination of said selected attribute values;

d) second providing means comprising said CPU for providing said test data creation and deletion functions; and e) execution means coupled to said first and second providing means comprising said CPU and an interface, for providing test function execution selection to said test driver and executing said test driver.

26. The apparatus as set forth in claim 25, wherein, said test functions are auto-checking test functions; and said test driver accumulates testing result statistics for said selected auto-checking test functions after executing each of said selected auto-checking test functions.

* * * * *